US011745556B2

(12) United States Patent
Heon et al.

(10) Patent No.: US 11,745,556 B2
(45) Date of Patent: Sep. 5, 2023

(54) EASILY RETROFITTABLE AIR SUSPENSION BRACKETS, METHOD OF MAKING AND METHOD OF USING

(71) Applicant: Wheel Pros, LLC, Greenwood Village, CO (US)

(72) Inventors: Reno Heon, San Luis Obispo, CA (US); Dustin Heon, Arroyo Grande, CA (US)

(73) Assignee: Wheel Pros LLC, Greenwood Village, CO (US)

( * ) Notice: Subject to any disclaimer, the term of this patent is extended or adjusted under 35 U.S.C. 154(b) by 0 days.

(21) Appl. No.: 17/902,968

(22) Filed: Sep. 5, 2022

(65) Prior Publication Data

US 2023/0076886 A1     Mar. 9, 2023

Related U.S. Application Data

(60) Provisional application No. 63/241,042, filed on Sep. 6, 2021.

(51) Int. Cl.
   *B60G 11/46*     (2006.01)

(52) U.S. Cl.
   CPC ........ *B60G 11/46* (2013.01); *B60G 2204/126* (2013.01); *B60G 2204/43* (2013.01); *B60G 2800/162* (2013.01)

(58) Field of Classification Search
   CPC .. B60G 11/46; B60G 11/32; B60G 2204/126; B60G 2204/43; B60G 11/465; B60G 2206/911
   See application file for complete search history.

(56) References Cited

U.S. PATENT DOCUMENTS

| 3,578,355 | A |   | 5/1971 | Oeder |
|---|---|---|---|---|
| 3,730,550 | A |   | 5/1973 | Thaxton |
| 4,919,399 | A | * | 4/1990 | Selzer .................... B60G 11/04 267/31 |
| 4,923,210 | A | * | 5/1990 | Heider ............... B60G 17/0155 180/41 |
| 5,464,245 | A | * | 11/1995 | Vogler .................. B60G 11/113 280/124.17 |
| 5,938,221 | A |   | 8/1999 | Wilson |
| 6,406,007 | B1 |   | 6/2002 | Wilson |

(Continued)

FOREIGN PATENT DOCUMENTS

| CA | 2583991 C | 1/2013 |
|---|---|---|
| CN | 113547884 A | 10/2021 |

(Continued)

OTHER PUBLICATIONS

Watanabe, Lower Bracket and Air Spring Mounting Structure, Jul. 26, 2018, EPO, JP 3217201 U, Machine Translation of Description (Year: 2018).*

*Primary Examiner* — Paul N Dickson
*Assistant Examiner* — Matthew D Lee
(74) *Attorney, Agent, or Firm* — Eric Hanscom

(57) ABSTRACT

A Retrofittable Air Suspension Brackets assembly comprises an air spring retained between an Upper Air Spring Mount and a Lower Air Spring Bracket. The Upper Air Spring Mount is attached to Upper Frame Brackets that are held in place by two U-Bolts, which also secure the Lower Air Spring Bracket and a Cradle Structure which limits movement of the vehicle frame member.

11 Claims, 2 Drawing Sheets

(56) References Cited

U.S. PATENT DOCUMENTS

| | | |
|---|---|---|
| 6,752,407 B2 | 6/2004 | Warinner |
| 7,500,688 B2 | 3/2009 | Mullican |
| 7,614,630 B2 | 11/2009 | Myers |
| 7,938,418 B1 | 5/2011 | Coombs |
| 8,226,098 B2 | 7/2012 | Vandenberg |
| 9,649,906 B2 | 5/2017 | Myers |
| 10,076,940 B2 | 9/2018 | Wall |
| 10,994,581 B2 | 5/2021 | Keeler |
| 11,376,970 B2 | 7/2022 | Yu |
| 2002/0096841 A1* | 7/2002 | Hedenberg ............. B60G 17/08 280/124.157 |
| 2006/0290090 A1* | 12/2006 | Leden ................... B60G 11/27 280/124.135 |
| 2007/0013160 A1 | 1/2007 | Richardson |
| 2007/0273072 A1* | 11/2007 | Simard ................ B60G 11/465 267/31 |
| 2008/0023931 A1* | 1/2008 | Myers .................... B60G 11/28 280/124.157 |
| 2009/0278290 A1* | 11/2009 | Trowbridge ........... B60G 11/28 267/120 |
| 2011/0057406 A1 | 7/2011 | Chalin |
| 2013/0320644 A1* | 12/2013 | Wilson ..................... F16F 1/26 280/124.11 |
| 2019/0255900 A1 | 8/2019 | Keiserman |
| 2022/0371390 A1* | 11/2022 | Wineland ................. F16F 1/26 |

FOREIGN PATENT DOCUMENTS

| | | | |
|---|---|---|---|
| CN | 113829820 A | 12/2021 | |
| CN | 215244212 U | 12/2021 | |
| CN | 216610772 U | 5/2022 | |
| CN | 216915434 U | 7/2022 | |
| DE | 102014012530 A1 | 3/2016 | |
| EP | 2319716 A1 * | 5/2011 | ............. B60G 11/44 |
| EP | 2990240 A1 * | 3/2016 | ............. B60G 11/16 |
| JP | 3217201 U * | 7/2018 | |
| WO | WO-2011109011 A1 * | 9/2011 | ............. B60G 11/10 |

* cited by examiner

EASILY RETROFITTABLE AIR SUSPENSION BRACKETS, METHOD OF MAKING AND METHOD OF USING

CROSS REFERENCE TO RELATED APPLICATIONS

This utility patent application claims priority back to U.S. Provisional No. 63/241,042, filed Sep. 6, 2021, the contents of which are incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of suspension for vehicles, and more particularly to novel technology relating to manufacturing of efficient and effective air suspension brackets that can be easily retrofitted onto existing vehicular frames. In particular, the product is designed for pickup truck frames, but has applicability to other types of vehicles as well. This patent application covers the method of using the product, the method of making the product and the end product itself.

Background of the Invention

Pickup trucks are used for a variety of punishing purposes, including carrying heavy loads and driving over rough roads. Most pickup truck have a combination of leaf-spring (mechanical) suspension and air suspension. However, retrofitting a new air suspension unit onto an existing frame is currently difficult and often results in less than ideal stress on the resulting point of attachment.

Problem Described

There are two basic types of pickup truck frames: C-shaped and Box shaped. When installing the upper mounting brackets for an air suspension system to a box shape frame, conventional solutions require the installer to reach inside the frame with stick nuts in order to affix the air spring bracket to the outer frame surface which takes a significant amount of time and often results in frustration for the installer. Conventional designs have the additional drawback of applying the air spring forces to the outer frame surface in a way that the frame material was not engineered for which can eventually fatigue the frame material.

Summary of Invention

The invention is a dual clamping system which uses "U-shaped" bolts to encircle the entire frame member. This effectively distributes the load on the frame member in a manner appropriate in terms of the frame member design. The invention also has several "cradles" that restrict the vertical movement of the air spring brackets. This is an important safety feature in cases where the installed under-torques the U-bolts. In addition to faster and less stressful installation, the invention provides a better engineered means of attachment such that there is less overall fatigue, and the modularity of the invention allows for it to be easily, removed, repaired and serviced.

Advantages Over Prior Art

The invention provides a number of improvements over existing technologies. The invention described herein utilizes a dual clamping system to affix the upper air spring brackets around the entire circumference of a box frame rail. The invention also includes redundant support structures ("cradles") which limit the potential vertical displacement of the upper air spring brackets in case the installer under torques the U-bolts. This invention results in significantly faster installation time combined with added rigidity and lack of frame fatigue concerns over all conventional designs.

Brief Description of Commercial Advantages

Compared to the state-of-the-art designs, the invention provides an air suspension system to be quickly and easily installed to the side of the box frame of a pickup truck. A variant of the design which includes stand-offs also allows this invention to be used on older "C" shaped frames. Benefits include:

Faster Installation Time

Avoids the use of "stick nuts" that must be fished inside of the box frame on conventional designs. Simple U-bolts are fast to install around the outside of the frame and the nuts can be torqued from the outside of the vehicle while the wheel and tire are removed.

Reduced Installation Error

Tabs that reference factory hole locations on the frame along with the redundant "cradle" structures allow the installer to accurately position the assembly on the frame prior to tightening the U-bolts.

Avoids Frame Fatigue

Avoids applying the air spring load to only the outer frame surface which causes frame fatigue in conventional systems. The invention described herein instead distributes the air spring load across the entire box frame structure.

Prior Art

The prior art provides the current state-of-the-art in installable air springs.

For example, US Patent Publication 20090278290 provides an air spring generally comprises a first end closure, a flexible member coupled to the first end closure and defining a chamber that can be pressurized, and a first mounting member projecting from the first end closure in a first direction. However, this method of attachment uses barbs rather than U-Bolts so it is more difficult to install and does not alleviate the stresses on the frame that the current invention avoids.

Similarly, U.S. Pat. Nos. 9,649,906, 3,730,550 and CA2583991 provide two other air spring attachment methods, but both of these requires bolting the air spring assembly to the vehicle frame, which will result in more stresses onto the frame due to the bolt holes. The current invention provides a solution that does not include having to drill any holes into the vehicle frame, thereby creating a more easily installed product without damage to the vehicle frame.

U.S. Ser. No. 10/994,581 describes a spread active clamp group for vehicle leaf spring, which is overly complicated compared with the current invention. CN113547884 and CN113829820 to Dongfen Liuzhou Motor covers a composite air suspension system with a frame, a spring suspension and an axle, where the spring suspension comprises a steel plate spring, an air spring, a shock absorber, a front support, a lifting lug and a rear support; and the air spring bears the whole sprung mass, and the leaf spring is in the reverse bow state, so that the deformation of the leaf spring can be reduced, the working stress of the leaf spring is obviously reduced, the fatigue damage of the leaf spring is slowed down, and the service life of the leaf spring is prolonged. This invention, however, only works on the front suspension of a large truck or other large vehicle, as opposed to the current invention which is specifically designed to work on the back suspension of a regular passenger vehicle such as a pickup truck. This invention, like the previous one, is overly complicated and expensive when compared to the current invention.

Likewise, Chinese patent No. CN215510772 to FAW Jiefang Automotive describes another front suspension system with a front air suspension that is symmetrically arranged at two ends of a front axle and comprises a steel plate spring, a lifting ring, an air spring assembly and a longitudinal reaction rod, the lifting ring is hinged to a frame, the steel plate spring is integrally arranged, the front end of the steel plate spring is hinged to the frame, the rear end of the steel plate spring is hinged to the lifting ring, the air spring assembly comprises a base and an air spring, the base is connected to the front axle and tightly presses the steel plate spring on the front axle, one end of the air spring is connected to the frame, the other end of the air spring is connected to the base, the longitudinal reaction rod is perpendicular to the front axle, one end of the longitudinal reaction rod is connected to the frame, and the other end of the longitudinal reaction rod is connected to the base; the automobile comprises the front air suspension. The longitudinal reaction rod can resist longitudinal impact force, so that S-shaped deformation of the steel plate spring during braking is limited, the steel plate springs are integrally arranged, a plurality of steel plate springs are not required to be added for reinforcement, and the running stability of the automobile is kept. As with the previous two prior arts, however, this system is design for a front suspension while the current invention is designed for the rear suspension.

The prior art also features CN216915434 to Shanghai Nomang Information Technology Co Ltd, which provides an air suspension middle lifting device that relies on a pair of U-shaped poles that run through a mounting plate downside, with a steel sheet is located the inboard of U-shaped pole down, allowing a dead axle all to run through on every U-shaped pole. This invention, however, does not offer a compact, easily installed and replaced air suspension device that works on the rear suspension of a vehicle.

CN215244212 to Jiangxi Isuzu Mortors discloses a combination suspension structure combining a steel plate spring and an air spring, with the steel plate springs positioned at two sides of a vehicle body, two air springs positioned at the center of the steel plate springs, a rear axle positioned between two hubs, a transverse stabilizer bar, a vehicle body height sensor and a shock absorber; the two ends of the leaf spring are fixed on the frame through hinges and lifting lugs respectively, and the connecting end of the transverse stabilizer bar is hinged with the frame and used for improving transverse tilting of the vehicle. This invention does not solve the problem that the current invention solves There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

The present invention is a uniquely designed air spring retention device, utilizing unique and effective/efficient technologies to create a superior, cost-effective product that is significantly easier to install and maintain, as well as providing a more structural sound attachment to the frame of a vehicle. The various advantages provided by this invention are described more fully with respect to the drawings that have been provided.

Figure 1:
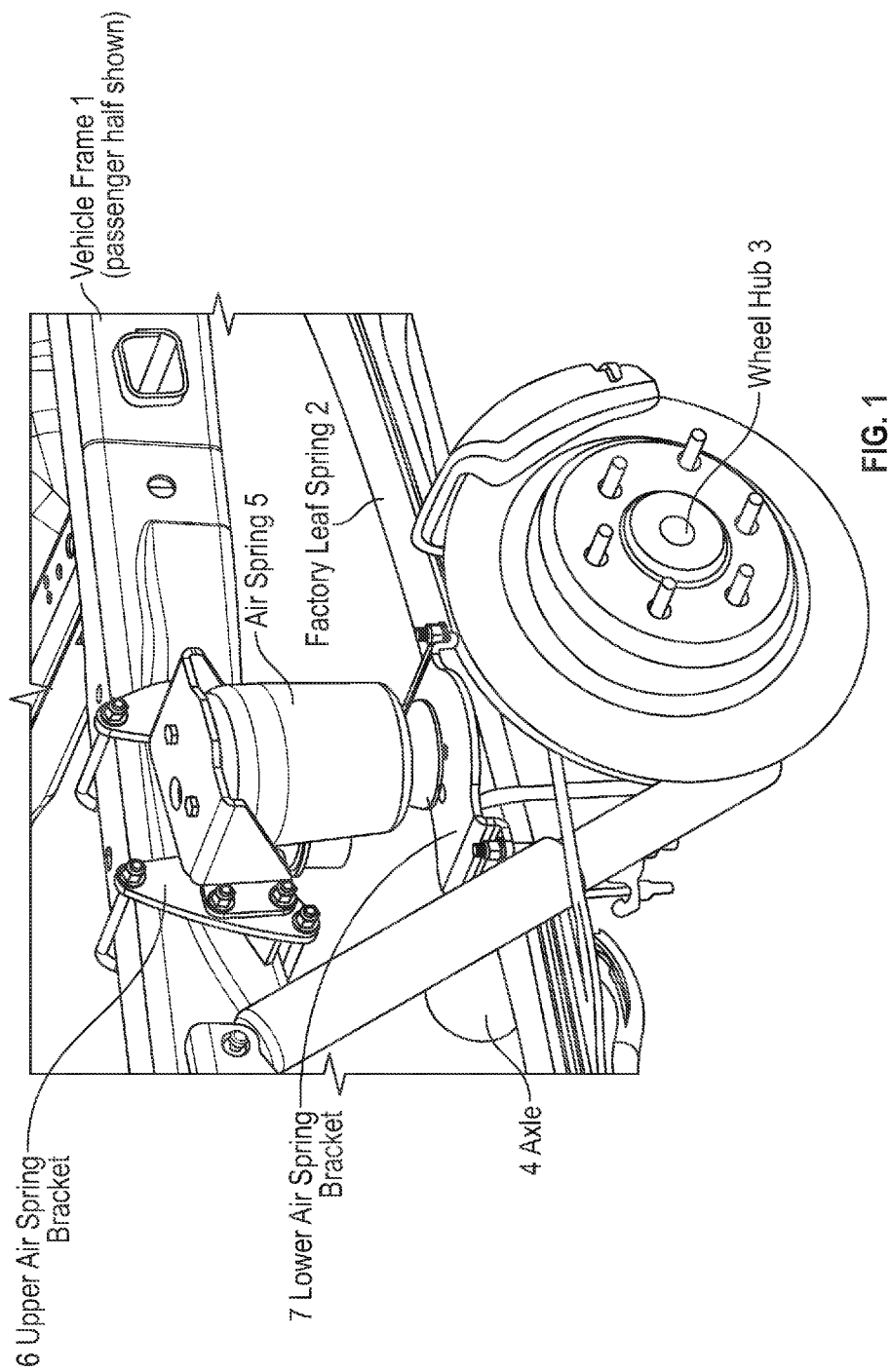
FIG. 1 is a side, perspective view of one preferred embodiment of the air spring bracket.

FIG. 1 is a side, perspective view of one preferred embodiment of the air spring bracket. When a vehicle such as a pickup truck is sold, it comes with a Factory Leaf Spring 2 that provides suspension between the Vehicle Frame 1 and the Axel 4. The Wheel Hub 3 is attached to the Axel 4, and wheels are tires are attached to the Wheel Hub 3. Resting on and attached by U-Bolts and nuts to the top of the Factory Leaf Spring 2 is a Lower Air Spring Bracket 7. Attached to the Vehicle Frame 1 is an Upper Air Spring Bracket 6. An Air Spring 5 is secured between the Lower Air Spring Bracket 7 and the Upper Air Spring Bracket 6.

Figure 2:
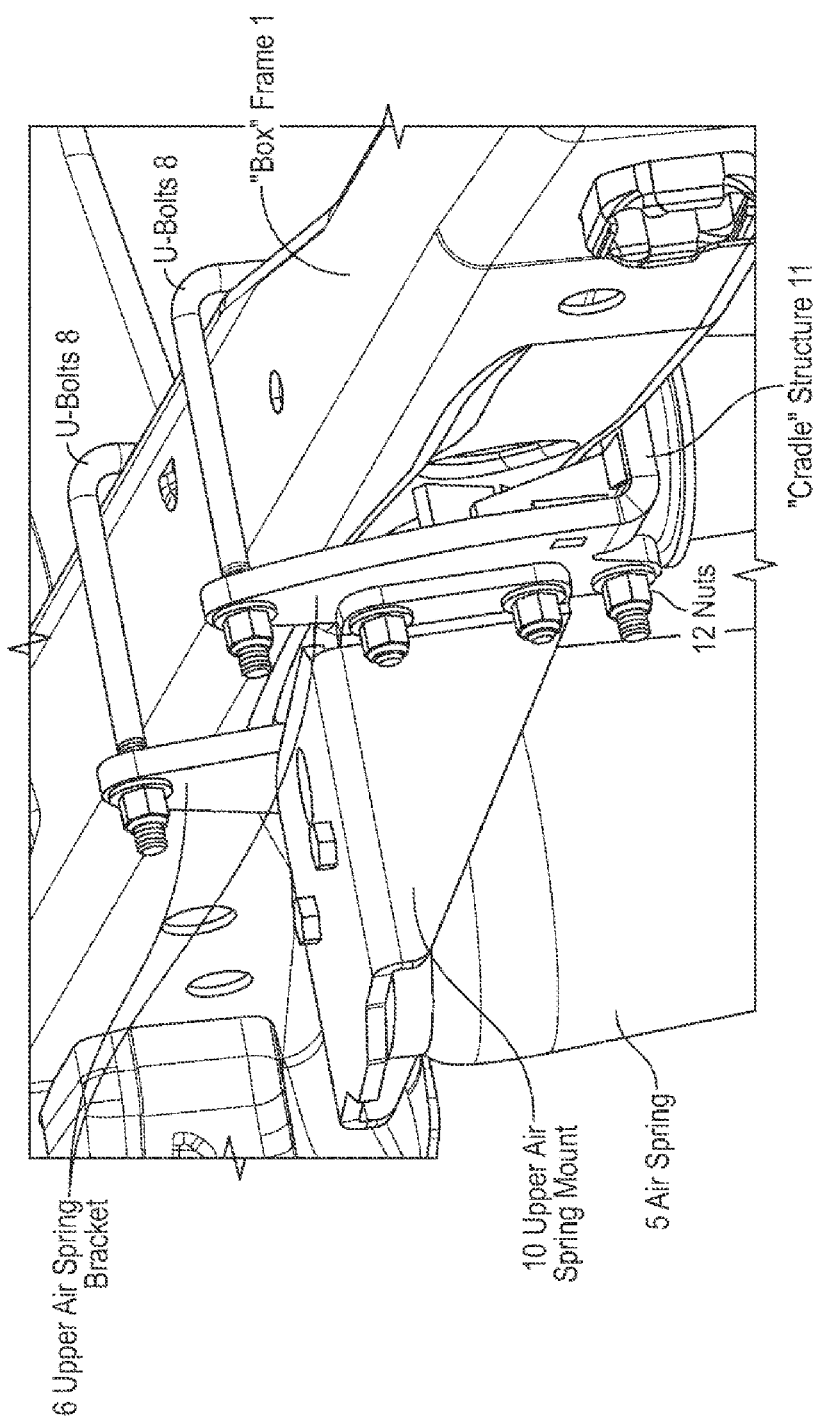
FIG. 2 is a back, perspective view of the embodiment displayed in FIG. 1.

FIG. 2 is a back, perspective view of the embodiment displayed in FIG. 1. Two U-Bolts 8 extend around the Vehicle Frame 1 to secure, through Nuts 12, the Upper Frame Brackets 9 and the Cradle Structure 11. The Air Spring 5 is secured to the Upper Air Spring Mount 10, which is secured to the Upper Frame Brackets 9 by bolts and nuts.

This invention allows an installer to merely attach the Lower Air Spring Bracket 7 to the Factory Leaf Spring 2, then snap the U-Bolts 8 around the Vehicle Frame 1 and use nuts to secure the U-Bolts 8 to the Vehicle Frame 1, thereby securing the Upper Air Spring Bracket 6 as well as the Air Spring 5. By not having to reach around behind the back of the frame, the installer can skip the most difficult and stressful part of the current installation practice done under the prior art. By completely encircling the vehicle frame, the method of attachment spreads out the force on it, providing a means of attachment to the vehicle frame that causes less fatigue in the metal.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

Many aspects of the invention can be better understood with references made to the drawings as attached. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

FIG. 2 is a back, perspective view of the embodiment displayed in FIG. 1. Two U-Bolts 8 extend around the Vehicle Frame 1 to secure, through Nuts 12, the Upper Air Spring Frame Brackets 6 and the Cradle Structure 11. The Air Spring 5 is secured to the Upper Air Spring Mount 10, which is secured to the Upper Air Spring Frame Brackets 6 by bolts and nuts.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. Vehicle Frame
2. Factory Leaf Spring
3. Wheel Hub
4. Axel
5. Air Spring
6. Upper Air Spring Bracket
7. Lower Air Spring Bracket
8. U-Bolts
10. Upper Air Spring Mount
11. Cradle Structure
12. Bolts

We claim:

1. A rear air suspension bracket assembly device consisting of, an air spring, a lower air spring bracket, two upper air spring brackets,-two U-Bolts, an upper air spring mount, and a cradle structure, where the lower air spring bracket is attached to a factory leaf spring, where the two upper air spring brackets are attached to a vehicle frame, where the air spring is secured at an upper end to the two upper air spring brackets, and where the air spring is secured at a lower end to the lower air spring bracket, where the two U-Bolts encircle the vehicle frame, and where the two U-Bolts are attached to both the cradle structure and the two upper air spring brackets by a plurality of nuts, where the upper air spring mount is attached to the two upper air spring brackets by a plurality of upper frame bots and upper frame nuts, where the cradle structure provides an amount of limitation to movement of the vehicle frame.

2. An air suspension bracket assembly device comprising, an air spring, a lower air spring bracket, two upper air spring brackets,-two U-Bolts, an upper air spring mount, and a cradle structure, where the two U-Bolts encircle the vehicle frame, and where the two U-Bolts are attached to both the cradle structure and the two upper air spring brackets by a plurality of cradle nuts.

3. The device of claim 2, where the lower air spring bracket is attached to a factory leaf spring.

4. The device of claim 2, where the two upper air spring brackets are attached to a vehicle frame.

5. The device of claim 2, where the air spring is secured at an upper end of the two upper air spring brackets, and where the air spring is secured at a lower end of the lower air spring bracket.

6. The device of claim 2, where the upper air spring mount is attached to the two upper air spring frame brackets by a plurality of upper frame bolts and upper frame nuts.

7. The device of claim 6, where the cradle structure provides an amount of limitation to movement along the vehicle frame.

8. The device of claim 7, where the vehicle frame has a front suspension section and a rear suspension section, and the air suspension bracket assembly attached to the rear suspension section.

9. An air suspension bracket assembly device consisting of, an air spring, a lower air spring bracket, two upper air spring brackets, two U-Bolts, an upper air spring mount, and a cradle structure, where the lower air spring bracket is attached to a factory leaf spring, where the two upper air spring brackets are attached to a rear suspension section of a vehicle frame, and where the two U-Bolts encircle the vehicle frame.

10. The device of claim 9, where the air spring is secured at an upper end to the two upper air spring brackets, and where the air spring is secured at a lower end to the lower air spring bracket, and where the two U-Bolts are attached to both the cradle structure and the upper air spring brackets by a plurality of nuts.

11. The device of claim 10, where the upper air spring mount is attached to the upper air spring brackets by a plurality of upper frame bolts and upper frame nuts, where the cradle structure provides an amount of limitation to movement along the vehicle frame.

* * * * *